3,769,310
REDISTRIBUTION OF ALKYLHYDROSILANES
Armando G. Viego and Harry R. McEntee, Waterford, N.Y., assignors to General Electric Company
No Drawing. Continuation-in-part of abandoned application Ser. No. 100,456, Dec. 21, 1970. This application June 7, 1972, Ser. No. 260,540
Int. Cl. C07f 7/08, 7/12
U.S. Cl. 260—448.2 P       12 Claims

ABSTRACT OF THE DISCLOSURE

A process for effecting redistribution between two silanes at substantially anhydrous conditions comprising reacting a hydrocarbon-substituted hydrochlorosilane with another hydrocarbon-substituted chlorosilane at a temperature above 30° C. and in the presence of a catalyst which may be aluminum chloride, wherein one of the silanes contains at least one chlorine atom, and wherein the hydrosilane is present at a concentration that is above 10 mole percent and preferably above 15 mole percent based on the two silane reactants.

BACKGROUND OF THE INVENTION

The present case in a continuation-in-part of the patent application entitled "Redistribution of Alkylhydrosilanes," Ser. No. 100,456, filed Dec. 21, 1970, and abandoned.

This invention relates to chlorosilanes, and in particular to the redistribution of two silanes wherein at least one of the silanes is a hydroorganochlorosilane and wherein there is at least one chlorine atom and one hydrocarbon substituent group in both of the silanes.

In the widely known method of the production of chlorosilanes, methylchloride is reacted with silicone in the presence of a copper catalyst to form alkylchlorosilanes and, in particular, methylchlorosilanes. In such reactions, the dimethyldichlorosilane is the principal product. There is obtained in such reactions minor amounts of other compounds including trimethylchlorosilane, dimethylchlorohydrosilane and methyltrichlorosilane. The dimethylchlorohydrosilanes and dimethyldichlorosilanes have been found particularly useful in numerous synthesis and therefore intensive research effort has been undertaken into methods for increasing the yields of these silanes. Such methods involved investigating the modifications of all known reactions which yield the methyltrichlorosilanes or by reacting the methyltrichlorosilane with other compounds whereby one or more chlorine atoms are removed. However, these other methods have been found to be inefficient or too expensive.

In the patent to Bailey et al., U.S. Pat. 2,732,282, the inventors disclose a method for redistribution of alkylhydrochlorosilanes. Thus, in such redistribution, an alkylchlorohydrosilane is heated in the the presence of a catalyst to produce two different chlorosilanes, one of which contains more chlorine atoms and fewer hydrogen atoms bonded to the silicone of the starting material and the other which contains fewer chlorine atoms and more hydrogen atoms bonded to silicone of the starting chlorosilane. The reaction temperature for this reaction is preferably 150° to 200° C. and the catalyst which is used is a nitrile catalyst and preferably a cyclic nitrile, which is used in a concentration of 1% to 50% by weight of the chlorosilane. The disclosure of this patent suffers from the deficiency that the hydrocarbon radicals on the silane are not redistributed. Only the hydrogen and chlorine atoms are distributed in the molecule. Accordingly, with this process, it is not possible to obtain products which have a different number of hydrocarbon radicals attached to the silane product than was present in the initial reactant. Further, the process is inefficient and low yields of the resulting product are obtained.

Another patent relating to redistribution, the patent to McEntee, U.S. Pat. 2,786,961, discloses the reaction of an alkylchlorosilane with an alkyl or phenyl chlorosilane at a temperature in the range of 50° to 225° C. in the presence of an organosilicon composition containing an SiH grouping as a catalytic promoter and also in the presence of a second catalyst, aluminum chloride, to promote redistribution between the alkyl radicals and the chlorine radicals in the silanes. This patent distinguishes from the disclosure of the prior art in that the reaction can be carried out in a temperature range of 50° to 225° C. in the liquid phase whereas the prior art discloses temperatures in excess of 250° or 300° C. In the reaction set forth in McEntee, the hydrosilicon monomer is used only for the purpose of a catalytic promoter and does enter the reaction. McEntee does not disclose or intend to disclose the redistribution of such hydrosilanes. In fact, McEntee discloses that such hydrosilane monomers which are used as catalytic promoters may be used in the ratio of from .01 to 10% by weight, based on the total weight of the reactants, which reactants are a mixture of chlorosilanes.

Dimethylhydrochlorosilane is formed in very small amounts from the silicone, methylchloride process while methylhydrodichlorosilane is formed in much larger proportions. Dimethylhydrochlorosilane is particularly desirable since it is used as an intermediate reactant to form gamma-cyanopropyldimethylchlorosilane which is used to produce polyurethane foam additives. Further, it is used to produce other compounds which are used in one-package and two-package room temperature vulcanizing silicone compositions.

Accordingly, it is one object of the present invention to provide a redistribution reaction between a hydroorganochlorosilane and a hydrocarbon-substituted chlorosilane to produce a redistributed hydroorganochlorosilane product.

It is another object of the present invention to provide an efficient process for redistributing a hydroorganochlorosilane with hydrocarbon-substituted chlorosilane.

It is yet still another object of the present invention to provide a redistribution reaction process between a hydroorganochlorosilane and a hydrocarbon-substituted chlorosilane which can be carried out at low temperatures.

It is yet another aim of the present invention to provide a process for producing dimethylhydrochlorosilane in high yields.

These and other objects of the present invention are accomplished by the process set forth below.

SUMMARY OF THE INVENTION

In accordance with the present invention there is provided a process for effecting redistribution between silanes under substantially anhydrous conditions which comprises reacting a first compound of the formula, (1)  $R_aH_bSiCl_{4-a-b}$ with a second compound of the formula, (2)  $R'_cH_dSiCl_{4-c-d}$ at a temperature above 50° C. and in the presence of a catalyst where R and R' are hydrocarbon radicals selected from alkyl radicals and aryl radicals, $a$ is a whole number that varies from 1 to 2, $c$ is a whole number that varies from 1 to 3, $d$ is a whole number that varies from 0 to 2, such that there is at least one chlorine atom in both of the above compounds and such that said first compound is present at a concentration of about 10 mole percent based on the two compounds and more preferably at a concentration above 15 mole percent based on the two compounds. The preferred catalyst is aluminum trichloride. However, other less efficient catalysts may be used in the above process, such as zirconium tetrachloride, potassium aluminum tetrachloride, cuprous chloride, boric acid and boron trifluoride. The reaction may be generally carried out at a temperature of 50° to 250° C. and preferably in the range of 70° to 130° C.

In order to maintain the reactants in a liquid state, which is preferable in order not to have an unduly large reactor, the reaction is carried out at a pressure of 10 to 100 p.s.i.g. Further, in order to obtain optimum yields from the reaction, said first compound is used in an amount of 25 to 75 mole percent to the reaction mixture of said two compounds and preferably 30 to 40 mole percent of the reaction mixture of said two compounds. In the preferred reaction, the first compound is methylhydrogendichlorosilane and the second compound is trimethylchlorosilane. With these two reactants, there is obtained the preferred products of dimethylhydrochlorosilane and dimethyldichlorosilane. Dimethyldichlorosilane is also a desirable product in that it has many varied uses. It is used to produce the long chain polymers which are used to form room temperature vulcanizable rubber and heat curable rubber. It is also used to produce greases and lubricants.

DETAILED DESCRIPTION OF THE PREFERRED EMBODIMENT

The groups R and R' in the above formulas may be selected from alkyl radicals, such as methyl, ethyl, propyl, isopropyl, butyl, amyl, octyl, etc. Preferably, R and R' are lower alkyl radicals of from 1 to 4 carbon atoms. Compounds in which R and R' are alkyl radicals within the scope of the formula recited above are, for instance, methylhydrodichlorosilane, methyltrichlorosilane, dimethyldichlorosilane, dimethylhydrochlorosilane, trimethylchlorosilane, triethylchlorosilane, ethyltrichlorosilane, tripropylchlorosilane, diisopropyldichlorosilane, dibutyldichlorosilane, triisobutylchlorosilane, amyltrichlorosilane, etc. Examples of aryl radicals which R or R' may be are, for instance, phenyl, tolyl, xylyl, diphenylnaphthyl, etc. Preferably, R and R' are lower alkyl radicals, such as those containing from 1 to 4 carbon atoms and, in particular, it is preferred that R and R' be methyl.

In regard to the two types of compounds reacted, it is preferred that one of the silanes have a hydrocarbon connected to it and that both silanes have at least one chlorine atom attached to the silicon. In that manner, redistribution can be carried out between a chlorine atom and an alkyl group.

Examples of mixtures of the two compounds which may be employed in the present reaction are dimethyldichlorosilane, methylchlorodihydrosilane, dimethylhydrochlorosilane, methyltrichlorosilane and dimethyldichlorosilane, etc. These are just a few of the possible reactants which come within the scope of Formulas 1 and 2 that may be used in this redistribution reaction of the present case. In particular, the preferred reactants are methylhydrodichlorosilane and trimethylchlorosilane. As stated previously, the compounds of Formulas 1 and 2, in order to redistribute in accordance with the process of the present case, have two limiting factors as to the groups attached thereon. There is at least one hydrogen atom attached to one of the silane compounds and there is at least one chlorine atom in such compound. In that manner, there can be redistribution between a hydrocarbon-substituted group of one compound and the chlorine atom of the other compound.

In both of the above compounds involved in the redistribution reaction there must be at least one chlorine atom present in each compound and there must be present at least one organo or hydrocarbon substituent group in such compound. Further, there must be at least one hydrogen atom in at least one compound and preferably the compound of Formula 1 although both compounds can have a hydrogen atom. Thus, prior to the present invention, the redistribution of methylhydrogendichlorosilane with trimethylchlorosilane to produce dimethylhydrochlorosilane in high yields was not known. More specifically, the redistribution of an organohalogenhydrosilane with an organohalogensilane so as to redistribute in the two compounds, the organo substituent groups and halogen groups, and obtain a high yield of the organohydrohalogensilane was not known. In the most preferred case there is obtained a product at high yield in which product the organo substituent groups and the halogen or chloro groups have been redistributed with the hydrogen group remaining substantially the same. However, it is even possible with the process of the present case to redistribute the hydrogen atoms. In the most preferred embodiment of the process of the present case of the desired product, it is preferred not to redistribute the hydrogen groups. It is preferred to redistribute the organo substituent and the halogen substituents of both compounds so as to arrive at the desired compounds.

Thus, the redistribution of an organo substituted halogen-hydrogensilane with an organo substituted halogensilane where the organo groups and halogen groups in both compounds are redistributed with preferably no redistribution of the hydrogen atoms which redistribution is carried out in high yields has not been achieved prior to this time. It can be appreciated that it is possible to carry out the process of the present invention such that the hydrogen groups are redistributed. However, the advantages of the process of the present invention is that organo substituent groups and halogen substituent groups of two silane compounds, both of which have such groups and wherein preferably only one has hydrogen groups, can be redistributed in high yields in the two compounds with only minor redistribution of the hydrogen groups.

The most preferred reaction within the scope of the present invention is the redistribution of methylhydrogendichlorosilane with trimethylchlorosilane to produce in high yields dimethylhydrogenchlorosilane and dimethyldichlorosilane. Thus, in the most preferred embodiment $a$ is 1, $b$ is 1, $c$ is 3 and $d$ is 0. In a less preferred embodiment $a$ is 1, $b$ is 2, $c$ is 2 and $d$ is 0. In another less preferred embodiment, $a$ is 1, $b$ is 2, $c$ is 2 and $d$ is 1.

Irrespective of the particular compounds within the scope of Formulas 1 and 2 used in the redistribution reaction, it is necessary in the present invention that both compounds to be redistributed have organic substituents as well as halogen substituents and wherein at least one of the compounds has a hydrogen substituent so that when the compounds are reacted there will be redistribution between the halogen atoms and the organic substituents of the two compounds.

One of the factors in the process of the present invention is that there be more than 10 mole percent and preferably more than 15 mole percent in the reaction mixture of the hydrosilane compound based on the two reactants. However, the preferable range of concentration of the hydrosilane reactant is 20 to 75 mole percent of the reaction mixture of the two compounds. More preferably, it is desirable that the hydrosilane compound be at a concentration of 30 to 40 mole percent of the two compounds. This more preferable range of 30 to 40 mole percent results in the production of the desired hydrodimethylchlorosilane in larger quantities from the starting materials. In particular, if methylhydrodichlorosilane is reacted with trimethylchlorosilane, it has been found that the largest amount of yield, as well as conversion of dimethylhydrochlorosilane from the initial reactants is obtained when there is a two-mole ratio of trimethylchlorosilane to hydromethyldichlorosilane in the reaction mixture.

Below a two-to-one mole ratio of the two reactants, such as, for instance, a one-to-one mole ratio of the two reactants, although the yield from one reactant chlorosilane is higher than at the two-to-one mole ratio, the yield from the reactant hydrosilane is substantially lower. Further, although the conversion from a chlorosilane such as trimethylchlorosilane is higher at a one-to-one mole ratio as compared to the two-to-one mole ratio, the conversion from the hydrosilane is substantially lower so that the overall conversion is considerably lower. Thus, at a two-to-one mole ratio of the two reactants, the overall yield and conversion from the two reactants is considerably higher. When the mole ratio is increased above two-to-one to 2.8 to 1 or as much as 4.0 to 1, although the yield from the hydrosilane increases somewhat, there is a tremendous drop in the yield from the chlorosilane such as trimethylchlorosilane, such that the overall yield at a 4.0 to 1 mole ratio is considerably smaller from both the hydrosilane and the trimethylchlorosilane than the overall yield obtained with a 2.0 to 1 mole ratio. The overall conversion to dimethylhydrochlorosilane is effected also in the same way. Thus, as one proceeds from 2.0 mole ratio to 2.8 to 4.0 mole ratio, although the conversion from the hydrosilane is increased somewhat, the conversion from the trimethylchlorosilane drops to a considerable degree so that the overall conversion obtained with the 4.0 to 1 mole ratio is considerably smaller than the overall conversion obtained with the 2.0 to 1 mole ratio.

Thus, it appears from the above discussion, the percent yield, as well as percent conversion of the initial hydrosilane to the redistributed product hydrosilane is optimized at a 2 to 1 mole ratio between the chlorosilane of Formula 2 and the hydrochlorosilane of Formula 1. This means that in the reaction mixture of the two silanes there is 66⅔ mole percent of the compound of Formula 2 mixed with 33⅓ mole percent of the hydrosilane of Formula 1. However, the preferable range in which the reaction may be carried out comprises 30 to 40 mole percent of the hydrosilane of Formula 1 with 70 to 80 mole percent of the chlorosilane of Formula 2 in the reaction.

There are several other advantages in utilizing the optimum proportions of the reactants as stated above other than obtaining a high conversion and a high yield of the redistributed hydrosilane from the initial reactant hydrosilane. One of these advantages is that a smaller amount of other hydrosilanes, other than the desired product, are formed. In particular, very small amounts of tetrahydrosilanes are formed. This results in a lower pressure being required for pressurizing the reactor during the reaction. Thus, the volatiles that are formed during the reaction may be reduced by as much as 30 mole percent or more by utilizing the optimum concentrations of the two silane reactants. The above optimzation of reactants has been discussed above particularly with the redistribution between methylhydrodichlorosilane and trimethylchlorosilane and may be pertinent to the production of other hydrosilanes from reacting compounds coming within the scope of Formulas 1 and 2, but the optimum ratios are not in general the same. In the redistribution of the preferred reactant, it should be mentioned that production of the redistributed dimethyldichlorosilane is a maximum at a 1 mole ratio of trimethylchlorosilane to methylhydrodichlorosilane and that the percent yield and percent conversion of dimethyldichlorosilane decreases as the mole ratio increases. Thus, it may be desirable to run the reaction at a mole ratio of 1 to 1 if it is desired to produce as large quantities as possible of the dimethyldichlorosilane, in conjunction with the production of large quantities of dimethylhydrochlorosilane. If it is desired to produce the maximum amount of dimethylhydrochlorosilane, then a 2.0 to 1 mole ratio is preferable. Thus, the mole percent of the hydrosilane in the reaction mixture of the two reacting compounds is more preferably varied from 30 to 40 mole percent, although it is understood that the hydrosilane may be used in concentrations as low as 15 mole percent in the reaction mixture. However, it should be noted that when the mole percent concentration of the hydrosilane reaction is 25 mole percent or below, that the percent yield as well as the percent conversion, with respect to the hydrosilane reactant of the redistributed hydrosilane product is uneconomically low.

In the process of the present case, the reaction of a compound of Formula 1 with a compound of Formula 2, is carried out generally at a temperature of above 50° C. If a temperature below 50° C. is used, then the reaction does not proceed at a sufficient rate. The upper limit for the reaction temperature is preferably 250° C. It should be pointed out that the reaction may be carried out above 250° C. However, when the reaction is carried out above 250° C., then unduly large pressures are required in the reactor so as to maintain the reactants in a liquid state and to prevent the catalyst from sublimating. Thus, generally the reaction may be carried out at a pressure of 10 to 100 p.s.i.g. Again, the reaction may be carried out at higher pressures. However, this necessitates the use of expensive reactors. Preferably, the reaction is carried out in a pressure of 40 to 70 p.s.i.g. The reaction may be carried out either in the liquid state or in the vapor state. However, the reaction should not be carried out where a reactant is mostly in the liquid phase and the other reactant mostly in the vapor state in that there is not obtained the proper content of the two compounds with the catalyst. Further, if the reaction is carried out in the vapor phase, then the catalyst should be sublimated so that it also is in the vapor phase so that the vapor phase reactants can come in contact with the catalyst.

Another disadvantage of having the reaction carried out totally in the vapor state is that an unduly large reactor is required. As such, it is preferable to carry out the reaction in the liquid state where the two compounds of Formulas 1 and 2 are in a liquid state and the catalyst is in the solid state.

One advantage of carrying out the process in this manner is that the liquid reactants can easily be separated from the solid catalyst so that the solid catalyst can be reused again to react additional quantities of reactants. In order to maintain the reactants in a liquid state, there must be a direct relationship between the reaction temperature and the pressure at which the reaction is carried out. As such, generally when a reaction temperature of 50° to 250° C. is used, there is desirably present 10 to 100 p.s.i.g. pressure in the reactor so as to maintain the reactants in the liquid phase and to prevent the catalyst from sublimating. In fact, it is preferable to carry out the reaction at a temperature in the range of 100° to 200° C. and at a pressure of 40 to 60 p.s.i.g., which reaction conditions will allow the reaction to proceed to completion in 2 to 7 hours and, preferably, in 2 to 4 hours.

If a reaction temperature of less than 50° C. is used, then it will take more than 7 hours for the reaction to be completed. It is necessary to understand the end point of the present reaction in order to determine the conditions which are necessary to reach the end point. The reaction between the two reactants, that is, the compounds of Formula 1 and Formula 2, is basically an equilibration reaction where the end point is reached when there is as much of the redistributed compound being formed as there is of the two reactants that are formed from the redistributed compounds. This equilibration end point is preferably reached with the reactants of Formulas 1 and 2 when the reaction temperature of 100° to 200° C. is used, in 2 to 4 hours. If a temperature above 200° C. is used, and particularly so if a temperature of 250° C. is used, then the equilibration reaction will reach its end point in less than 2 hours. However, such a reaction temperature of above 250° C. is undesirable in that excessive pressures are utilized. The reaction temperature of 100 to 200° C. permits the reaction to be carried out at 40 to 60 p.s.i.g. wherein the reactants are maintained basically in the liquid phase and the catalyst is prevented from sublimating. Further, the reaction is carried out in 2 to 4 hours, which is very advantageous as compared to the long reaction times that were experienced in the prior art. A reaction time of less than 2 hours would be desirable. However, with the necessity of keeping the size of the reactor within practical limitations and keeping the pressure of the reaction to a low, desirable level, a reaction time of 2 to 4 hours is obtained within the preferable temperature range set forth above. If a lower temperature is used within the preferable temperature range such as, say, 100° C., then it will take about 4 hours for the reaction to reach its equilibration end point.

It can be appreciated that the above preferred pressure, temperature and reaction times set forth above are set forth particularly for the reaction of dimethylhydrochlorosilane with trimethylchlorosilane and that these conditions would vary somewhat with different hydrochlorosilanes and different chlorosilanes, which variations would come within the broad general ranges set forth for the reaction temperature, pressure and period of reaction.

While it is desirable for economical reasons to maintain the preferable and even the general reaction temperature and pressure conditions set forth above, it should be understood that the reaction can be carried out outside of these ranges. Thus, for economic reasons, it is preferable that the equilibration reaction be carried out in the shortest time possible so that the reactor will be producing large quantities of the redistributed compounds per unit time. However, if time is not a factor, there is no reason why the reaction temperatures and pressures cannot be outside the limits set forth above. In particular, there is no reason why the reaction temperature need be limited to 250° C. if the reactor size or the use of highly pressurized reactors is not a factor in the operation of the reaction. Further, temperatures lower than 70° C. and generally lower than 50° C. may be used to carry out the equilibration reaction if short reaction times are not a controlling factor in carrying out the reaction.

The preferable catalyst for the process of the present case is aluminum trichloride. Aluminum trichloride is a solid that sublimates at 177° C. to a gas. At pressures of 50 to 60 p.s.i.g. with reaction temperatures of 100 to 200° C., it will remain a solid. Aluminum trichloride will redistribute hydrocarbon groups with chlorine groups. In fact, aluminum trichloride is the most efficient catalyst of the present case which will redistribute alkyl or phenyl groups on one silane molecule with hydrogen or will redistribute alkyl or aryl or hydrogen groups on one silane molecule with chlorine atoms on the other silane molecule. In general, it is preferable to use the catalyst in a concentration of 1 to 10% by weight based on the weight of the two reactants and preferably it is desirable to have this catalyst present in a concentration of 3 to 7% by weight of the reactant mixture. If a concentration of lower than 1% is used, then the reaction is not catalyzed at a sufficient rate so that it will reach equilibration at the end of 7 hours. If more than 10% by weight of aluminum trichloride is used based on the weight of the two reactants, then the additional catalyst does not perform any beneficial catalytic activity. The catalyst level of 3 to 7% by weight of the two compounds forming the reaction mixture is preferable in that it allows the reaction to be carried out efficiently in 2 to 4 hours, and in any case, less than 7 hours reaction time.

Other catalysts that may be used in the redistribution reaction of the reactants of Formula 1 or 2 are zirconium tetrachloride, potassium aluminum tetrachloride, cuprous chloride, boric acid and boron trifluoride. Zirconium tetrachloride is not very effective in redistributing methyl groups with chlorine atoms. However, it is effective in redistributing phenyl groups with chlorine atoms. Thus, where R and R' are phenyl and it is desirable to redistribute the phenyl on one silane molecule with the chlorine atom on another silane molecule, then zirconium tetrachloride may be used as a catalyst.

Another catalyst which is effective in redistributing methyl groups with chlorine atoms is potassium aluminum tetrachloride. However, this catalyst is not very effective in redistributing phenyl groups with chlorine atoms. Its activity seems to be limited only to redistributing methyl and chlorine atoms.

Other catalysts which have been found effective to redistribute phenyl and chlorine atoms are cuprous chloride, boric acid and boron trifluoride. However, these three catalysts have not been found to be very effective in redistributing methyl radicals and chlorine radicals. Thus, it may be said that zirconium tetrachloride, cuprous chloride, boric acid and boron trifluoride are effective at redistributing aryl radicals on one silane molecule with chlorine atoms on another silane molecule. However, they are not very effective catalysts in redistributing alkyl radicals with chlorine radicals. On the other hand, potassium aluminum tetrachloride has been found effective in redistributing alkyl radicals on one silane molecule with chlorine radicals on another silane molecule, while it has not been found to be very effective in redistributing aryl radicals and chlorine radicals on different silane molecules.

These catalysts may be used in the redistribution reactions of the present case in the same concentration as that of aluminum trichloride, that is, 1 to 10% by weight of the reaction mixture of the compounds of Formulas 1 and 2. However, the aluminum trichloride is the all-purpose catalyst which is more efficient than the other catalysts disclosed above and which is suitable for redistributing alkyl or aryl radicals on one silane molecule with chlorine radicals on another silane molecule.

Although the above catalysts and, in particular, $AlCl_3$ are effective catalysts and catalyze the redistribution, reaction, it may be desirable to add a catalytic additive. A catalytic additive as defined in the present invention is not a catalyst, that is, it cannot be used by itself to promote the redistribution reaction but must be added along with one of the defined catalysts for certain desirable reasons. Thus, the catalytic additive may promote the catalyst activity to make it more active so that a larger amount of the desired product is formed or it increases the rate of reaction so that it takes less time for the reaction to reach completion. Another advantage to such a catalytic additive is that it may prolong the life of the catalyst so that the catalyst may be used for a longer period of time before it becomes inactivated or poisoned. This last advantage is especially important in that the catalysts are usually expensive so that it is necessary to obtain as much use out of it as possible. Further, it is time consuming and thus expensive to remove the catalyst between batches so it is desirable to leave the same catalyst in the reaction chamber for as many batches as possible so as to save on operating time.

A catalyst additive which is particularly effective in the redistribution reaction of the present case is magnesium. Generally, magnesium may be present in amounts of 1 to 15% by weight of the reaction mixture and preferably 1 to 5% by weight of the reaction mixture along with the defined catalysts such as $AlCl_3$, to promote the redistribution reaction. If less than 1% by weight of magnesium is used, it is not effective as a catalytic aid. If more than 15% by weight is used, the excess magnesium has no effect on the catalyst in the reaction.

The use of magnesium permits the defined catalysts to produce 1 to 5 mole percent more in some cases of the desired products, such as dimethylhydrogenchlorosilane, than would normally be produced without the magnesium. As stated previously, the reaction period is 2 to 7 hours for a reaction temperature of 50° C. to 250° C. With the use of magnesium, it is not necessary to heat the reactants, in some cases, to high temperatures such as 200° C. to obtain a reaction period of 2 to 3 hours. Thus, with the use of the indicated quantity of magnesium, a reaction period of 2 to 3 hours may be obtained at a reaction temperature of 150° C. and even at a reaction temperature of 100° C. The magnesium seems to act as a synergistic agent which enhances the activity of the catalyst. Further, if a reaction temperature of less than 100° C. is used, the use of magnesium will permit the reaction period to be less than 7 hours, such as 5 or 6 hours.

The use of magnesium also retards the deactivation or poisoning of the catalyst. During the redistribution reaction, intermediates that are formed tend to react with the catalyst, resulting in a loss of catalytic activity. Thus, if the same catalyst is used for up to 5 to 10 redistribution batches to form dimethylhydrogenchlorosilane, the $AlCl_3$ catalyst is inactivated to the point that there is 10 to 20 mole percent loss of the desired redistribution product. As a result of this deactivation of the catalyst, it is necessary to replace it after five redistribution batches and at most after ten redistribution batches. With the use of magnesium as a catalytic additive in the amounts stated above, it is possible to run fifteen to twenty-five redistribution batches before the catalyst becomes inactivated to the point where the process becomes inefficient.

As stated previously, the present process will proceed to completion without the catalytic additive magnesium. However, for the reasons given above, it is desirable to have magnesium present in the redistribution reaction.

The preferable reactants with Formulas 1 and 2 are methylhydrodichlorosilane and trimethylchlorosilane. If these two reactants are reacted under the preferable conditions set forth above, there is obtained dimethylhydrochlorosilane and dimethyldichlorosilane in high yields and high conversions of the reactants to the products. Other products that are obtained with this redistribution reaction is trihydrochlorosilane, dihydrodimethylsilane, hydrotrimethylsilane, dihydrodichlorosilane and dihydromethylchlorosilane. These hydrosilane compounds comprise the volatiles in the equilibration reaction mass, when the reaction has reached its equilibration point. There is also present in the composition a large amount of the product dimethylhydrochlorosilane and a smaller amount of the initial reactant methylhydrodichlorosilane. There is also present some hydrotrichlorosilane which also comprises part of the volatiles.

In addition, there is present the dimethyldichlorosilane desirable product and a certain amount of the initial reactant trimethylchlorosilane. After the volatiles are flashed off, the dimethylhydrochlorosilane and the dimethyldichlorosilane can be separated from the rest of the reaction mixture by distillation, since all of the remaining compounds have distinctive boiling points.

One of the difficulties in the production of dimethylhydrochlorosilane by the old procedure was that this product was produced with 2-methylbutene-2 present in the reaction mixture from the copper catalyst reaction. Since 2-methylbutene-2 has almost the same boiling point as dimethylhydrochlorosilane, it was very difficult to separate the two compounds. As a result, it was necessary to take the reaction mixture and put it into a reactor and then hydrochlorinate the mixture so that the double bond of the 2-methylbutene-2 was chlorinated and thus broken to produce compounds which had a boiling point different from dimethylhydrochlorosilane so that the dimethylhydrochlorosilane could be separated by distillation procedures. In the present case, due to the redistribution with the chlorine atoms, the double bond of the 2-methylbutene-2 is broken and the dimethylhydrochlorosilane obtained by the equilibration reaction, as well as any dimethylhydrochlorosilane originally present in the reaction mixture can be easily separated from the mixture by distillation. Thus, the present process of redistributing methylhydrodichlorosilane with trimethylchlorosilane completely eliminates one step of the process previously used to separate dimethylhydrochlorosilane from its synthesis mixture, as well as result in the production of additional amounts of dimethylhydrochlorosilane and dimethyldichlorosilane.

As pointed out previously, the methylhydrodichlorosilane in the reaction mixture should be present at a concentration above 10 mole percent of the mixture of the two reactant compounds of Formulas 1 and 2 and more preferably above 15 mole percent. Preferably, the methylhydrodichlorosilane should be in a concentration of 30 to 40 mole percent of the initial reaction mixture. As pointed out previously, this preferable concentration of the methylhydrodichlorosilane in the initial reaction mixture will produce optimum yields and optimum conversions of the dimethylhydrochlorosilane from the methylhydrodichlorosilane and from the trimethylchlorosilane initial reactants.

In order that those skilled in the art may better understand how the present invention is practiced, there is presented the following examples by way of illustration and not by limitation. All parts are by weight.

In all the following examples there was used a 500 cubic centimeter pressure reactor which was supplied with a suitable heating mantle which could be uniformly heated at elevated temperatures. All reactions were conducted under substantially anhydrous conditions. The temperature, pressure and conditions were such that essentially all the reactants were in the liquid phase where interaction took place. The catalyst was present in the solid phase.

EXAMPLE 1

In the reactor described above, there is added 60 mole percent of trimethylchlorosilane and 30 mole percent of methylhydrodichlorosilane. There is also present in the reaction mixture a total of 10 mole percent of tetramethylsilane, hydrotrichlorosilane, methyltrichlorosilane and silicon tetrachloride and 10% by weight of the reaction mixture of $AlCl_3$. The initial reaction mixture is pressurized in the reactor to 55 to 60 p.s.i.g. and cooked for 4 hours at a temperature of 127 to 130° C. After the four hour period, the volatiles in the reaction mixture are flashed for three hours at 8 to 38 p.s.i.g. at a temperature in the range of 118 to 144° C. The products of the reaction consist of 10 mole percent dimethylchlorosilane, 45 mole percent of trimethylchlorosilane, 25 mole percent of dimethyldichlorosilane and 5 mole percent of some silicon tetrachloride and other silanes.

EXAMPLE 2

Into the reactor described above there is charged 50 mole percent methyldichlorosilane and 50 mole percent of trimethylchlorosilane. To the liquid mixture of the two initial reactants, methyldichlorosilane and trimethylchlorosilane, there is added 10 percent by weight of the liquid mixture of aluminum trichloride. The pressure is raised to 50 p.s.i.g. at a temperature adjusted at 85 to 90° C. The reaction mixture is heated at that temperature for 2 hours. After the 2 hour period, the volatiles in the reactor were flashed for 2 hours at a pressure of 15 to 20 p.s.i.g. at a temperature of 60° C. The reaction procedure above is repeated with an identical reactor charge except that the reaction temperature was 90° to 95° C. The rest of the reaction procedure is the same as the reaction procedure for the first charge to the reactor. The analysis of the products obtained from the two processes are set forth in Table I below.

TABLE I.—ANALYSIS OF REACTION PRODUCTS

| Component | Mole percent | |
|---|---|---|
| | First charge product | Second charge product |
| $(CH_3)_4Si$ | N.D. | N.D. |
| $(CH_3)_2HSiCl$ | 12.25 | 9.4 |
| $CH_3HSiCl_2$ | 2.95 | 4.4 |
| $(CH_3)_3SiCl$ | 17.15 | 19.14 |
| $(CH_3)_2SiCl_2$ | 66.76 | 65.79 |
| $HSiCl_3$ | 0.8 | 0.39 |
| $CH_3SiCl_3$ | N.D. | 6.72 |
| $SiCl_4$ | N.D. | 6.13 |

In both reactions, dimethylhydrochlorosilane and dimethyldichlorosilane were obtained in high yields.

EXAMPLE 3

The same reactants, trimethylchlorosilane and methylhydrodichlorosilane, as used in the previous example, are charged in a mole ratio of 1.0. The reaction is adjusted to a pressure of 70 p.s.i.g. and the reactants are heated to a temperature of 170° C. for 4 hours. At the end of the four hour period, the reactor is cooled to room temperature and the equilibration reaction mixture is analyzed. The above procedure is repeated under identical conditions except the trimethylchlorosilane to methylhydrodichlorosilane mole ratio in the feed was varied from 1.0 to 1.6 to 2.0 to 2.8 and 4.0. The result of the analysis of the product mixtures in the reactors for the different mole ratio feeds is set forth in Table II below.

TABLE II

| | Boiling point, °C. | Equilibrium product composition, mol percent | | | | |
|---|---|---|---|---|---|---|
| | | [1] 1.0 | [1] 1.6 | [1] 2.0 | [1] 2.8 | [1] 4.0 |
| Component: | | | | | | |
| H$_4$Si | −112 | 0.038 | 0.011 | 0.006 | 0.002 | Nil |
| H$_3$SiMe | −58 | 0.60 | 0.33 | 0.23 | 0.13 | 0.06 |
| H$_3$SiCl | −30 | 0.08 | 0.02 | 0.01 | 0.004 | 0.001 |
| H$_2$SiMe$_3$ | −20 | 1.87 | 1.97 | 1.84 | 1.52 | 1.12 |
| HSiMe$_3$ | 7 | 0.67 | 1.33 | 1.67 | 2.12 | 2.40 |
| H$_2$SiCl$_2$ | 8 | 0.04 | 0.01 | 0.006 | 0.002 | Nil |
| H$_2$SiMeCl | 8 | 6.90 | 3.54 | 2.44 | 1.34 | 0.68 |
| Me$_4$Si | 27 | 0.07 | 0.28 | 0.47 | 0.91 | 1.59 |
| HSiCl | 32 | 0.006 | 0.001 | Nil | Nil | Nil |
| HSiMe$_2$Cl | 36 | 23.20 | 22.49 | 20.84 | 17.52 | 13.70 |
| HSiMeCl$_2$ | 41 | 7.54 | 3.55 | 2.43 | 1.36 | 0.73 |
| SiCl$_4$ | 57.6 | Nil | Nil | Nil | Nil | Nil |
| Me$_3$SiCl | 57.9 | 15.59 | 28.59 | 35.51 | 45.77 | 55.31 |
| MeSiCl$_3$ | 66.4 | 2.01 | 0.87 | 0.59 | 0.34 | 0.19 |
| Me$_2$SiCl$_2$ | 70 | 41.40 | 36.97 | 33.88 | 28.98 | 24.09 |
| Total volatiles,[2] mole percent | | 10.20 | 7.21 | 6.20 | 5.12 | 4.26 |
| Yield of HSiMe$_2$Cl, percent from— | | | | | | |
| HSiMeCl$_2$ | | 54.6 | 64.4 | 67.4 | 70.4 | 71.1 |
| Me$_3$SiCl | | 67.5 | 68.4 | 66.8 | 62.8 | 55.5 |
| Conversion to HSiMe$_2$Cl, percent: | | | | | | |
| HSiMeCl$_2$ | | 46.4 | 58.4 | 62.6 | 66.6 | 68.4 |
| Me$_3$SiCl | | 46.4 | 36.6 | 31.2 | 23.8 | 17.1 |

[1] Me$_3$SiCl/HSiMeCl$_2$ mole ratio in feed.
[2] (H$_4$Si, R$_3$SiCl, H$_2$SiCl$_2$, H$_2$SiMeCl, H$_3$SiMe$_2$ and HSiMe$_3$).

As can be seen for this table, the yield and conversion of dimethylhydrochlorosilane from methylhydrodichlorosilane increases rapidly from 54.6 to 67.4 percent and from 46.4 to 62.6 mole percent, respectively, as the mole ratio in the feed is increased from 1.0 to 2.0. Further, as the feed ratio varies from 1.0 to 2.0, less volatiles are formed such that the percent volatiles decreases from 10.2 mole percent to 6.2 mole percent and therefore the reaction pressure that is required is less. Further, the tetrahydrosilane concentration in the same variation of mole feed ratio decreases from 0.038 mole percent to 0.006 mole percent. As the mole feed ratio increases from 2.0 to 4.0, the percent yield of dimethylhydrochlorosilane from methylhydrodichlorosilane increases from 67.4 to 71.1, and the percent conversion increases from 62.6 to 67.4. However, using the same quantity of material of initial reactants as was used with the 2.0 mole feed ratio, there is a smaller quantity of dimethylhydrochlorosilane being formed. Further, the production of dimethyldichlorosilane as the mole feed ratio increases from 1.0 to 2.0 drops off from 41.40 mole percent to 33.88 mole percent. When the mole feed ratio increases from 2.0 to 4.0 percent, the production of dimethyldichlorosilane decreases from 33.88 mole percent to 24.09 mole percent. Thus, to get the largest amount of dimethylhydrochlorosilane being formed from the methylhydrodichlorosilane and from the trimethylchlorosilane and to obtain the highest conversion and yield at the same time, the mole ratio of 2.0 appears to produce the optimum results. That is, the mole feed ratio of 2.0 produces the largest quantity of dimethylhydrochlorosilane at the highest yield and the highest conversion. If the mole feed ratio is increased from 2.0 to 4.0, while the yield and conversion of dimethylhydrochlorosilane from methylhydrodichlorosilane increases somewhat, the yield of dimethylhydrochlorosilane from trimethylchlorosilane correspondingly decreases very sharply so that there is less total amount of dimethylhydrochlorosilane being formed. Further, it can be seen that the largest amount of mole percent of dimethyldichlorosilane is formed at the 1.0 mole ratio. The least amount of dimethyldichlorosilane is formed at the 4.0 mole ratio. Thus, the 2.0 mole feed ratio is the halfway point for producing a desirable amount of dimethyldichlorosilane while at the same time optimizing the production of dimethylhydrochlorosilane.

EXAMPLE 4

A steel pressure reaction vessel was filled approximately two-thirds full with 100 parts of a mixture containing 46.1% of trimethylchlorosilane, 51.9% of methyldichlorosilane, and 1% of tetramethylsilane. 7.4 parts of aluminum chloride and 0.22 part of magnesium were also charged to the reaction vessel. The vessel was sealed and reaction carried out at 120° C. for four hours. The contents of the reaction vessel were then distilled and 12.1 parts of dimethylhydrochlorosilane were obtained, together with dimethyldichlorosilane, unreacted trimethylchlorosilane and methyldichlorosilane.

What is claimed is:

1. A process for effecting redistribution between silanes at substantially anhydrous conditions comprising reacting a first compound of the formula $R_aH_bSiCl_{4-a-b}$ with a second compound of the formula $R'_cH_dSiCl_{4-c-d}$ at a temperature range of 50° to 250° C. and in the presence of a catalyst selected from the group consisting of AlCl$_3$, KAlCl$_4$, and BF$_3$, where R and R' are selected from the class consisting of alkyl radicals of 1 to 4 carbon atoms and phenyl radicals, $a$ is a whole number that varies from 1 to 2, $b$ is a whole number that varies from 1 to 2, $c$ is a whole number that varies from 1 to 3, and $d$ is a whole number varying from 0 to 2, $a$ and $c$ at all times being dissimilar such that there is at least one chlorine atom in both of the above compounds and such that said first compound is present at a concentration of 20 to 75 mole percent of the reaction mixture of the two compounds.

2. The process of claim 1 wherein said first compound comprises 30 to 40 mole percent of the reaction mixture of said two compounds.

3. The process of claim 2 wherein R and R' are methyl and $b$ is equal to 1.

4. The process of claim 1 wherein the catalyst is AlCl$_3$ and said first compound is methylhydrogendichlorosilane and said second compound is trimethylchlorosilane.

5. The process of claim 4 wherein the reaction is carried out at a pressure of 10 to 100 p.s.i.g.

6. The process of claim 1 wherein the reaction is allowed to proceed for 2–7 hours.

7. The process of claim 5 wherein there is obtained as the main products of the reaction, dimethylhydrogenchlorosilane and dimethyldichlorosilane.

8. The process of claim 1 wherein the said first and second compounds are in the liquid phase and said catalyst is a solid in intimate contact with said liquid phase.

9. The process of claim 4 wherein the process is carried out at a temperature in the range of 100° C. to 200° C.

10. The process of claim 4 wherein $AlCl_3$ is used at a concentration of 1 to 10% by weight of the reactant mixture.

11. The process of claim 1 wherein there is used, in addition to the aforesaid catalysts, 1–15% by weight of the reaction mixture of magnesium.

12. The process of claim 10 wherein there is used, in addition to $AlCl_3$, 1–5% by weight of magnesium.

References Cited
UNITED STATES PATENTS

| | | | |
|---|---|---|---|
| 3,135,778 | 6/1964 | Sleddon | 260—448.2 P |
| 3,557,176 | 1/1971 | Bazouin | 260—448.2 P |
| 2,887,500 | 5/1959 | McEntee | 260—448.2 P |
| 2,627,451 | 2/1953 | Erickson et al. | 260—448.2 P X |

DANIEL E. WYMAN, Primary Examiner

P. F. SHAVER, Assistant Examiner